United States Patent
Ojanne

(10) Patent No.: US 11,619,117 B2
(45) Date of Patent: Apr. 4, 2023

(54) THERMAL WELL HEAT CARRIER TRANSPORT SYSTEM AND METHOD FOR INSTALLATION OF THE SAME

(71) Applicant: ROTOTEC AB, Upplands Vasby (SE)

(72) Inventor: Mikko Ojanne, Järfälla (SE)

(73) Assignee: ROTOTEC AB, Upplands Väsby (SE)

( * ) Notice: Subject to any disclaimer, the term of this patent is extended or adjusted under 35 U.S.C. 154(b) by 43 days.

(21) Appl. No.: 17/287,684

(22) PCT Filed: Oct. 25, 2019

(86) PCT No.: PCT/SE2019/051057
§ 371 (c)(1),
(2) Date: Apr. 22, 2021

(87) PCT Pub. No.: WO2020/085990
PCT Pub. Date: Apr. 30, 2020

(65) Prior Publication Data
US 2021/0372238 A1 Dec. 2, 2021

(30) Foreign Application Priority Data

Oct. 26, 2018 (SE) .................... 1851336-6

(51) Int. Cl.
*F24T 10/10* (2018.01)
*E21B 43/10* (2006.01)
(Continued)

(52) U.S. Cl.
CPC ............ *E21B 43/103* (2013.01); *E21B 17/20* (2013.01); *E21B 19/16* (2013.01); *E21B 47/117* (2020.05);
(Continued)

(58) Field of Classification Search
CPC ...... E21B 43/103; E21B 47/117; E21B 17/20; E21B 19/16; E21B 17/042; F24T 10/10; F24T 10/17; F24T 2010/53
See application file for complete search history.

(56) References Cited

U.S. PATENT DOCUMENTS

| 2011/0036112 A1 | 2/2011 | Livingston |
| 2013/0327498 A1 | 12/2013 | Freitag |
| 2018/0340711 A1* | 11/2018 | Nguyen ............. F24T 10/17 |

FOREIGN PATENT DOCUMENTS

| WO | 0037862 A1 | 6/2000 |
| WO | 2008009289 A1 | 1/2008 |
| WO | 2012000009 A1 | 1/2012 |

OTHER PUBLICATIONS

International Search Report from corresponding International Application No. PCT/SE2019/051057 dated Jan. 17, 2020, 4 pages.

* cited by examiner

*Primary Examiner* — Taras P Bemko
(74) *Attorney, Agent, or Firm* — Tucker Ellis LLP

(57) ABSTRACT

The disclosed invention concerns a method for installing and operating a thermal well (110) heat carrier transport system (100). A first flexible tubular part (120) is provided into and along a thermal well (110), a second flexible tubular part (130) is provided into the first flexible tubular part (120) and a third open ended tubular part (140) is provided into the second flexible tubular part (130). During installation and operation an installation liquid and heat carrier, respectively, is provided into the second flexible tubular part at an overpressure sufficient to press the first flexible tubular part (120) radially against the inner all of the thermal well (110) in all radial directions. The invention also concerns a system.

21 Claims, 4 Drawing Sheets

(51) Int. Cl.
*F24T 10/17* (2018.01)
*E21B 47/117* (2012.01)
*E21B 17/20* (2006.01)
*E21B 19/16* (2006.01)
*F24T 10/00* (2018.01)
*E21B 17/042* (2006.01)

(52) U.S. Cl.
CPC ............ *F24T 10/17* (2018.05); *E21B 17/042* (2013.01); *F24T 2010/53* (2018.05)

THERMAL WELL HEAT CARRIER TRANSPORT SYSTEM AND METHOD FOR INSTALLATION OF THE SAME

The present invention relates to a thermal well system and to a method for installation of the same.

It is well-known to use thermal wells for thermal exchange with the ground. Such a thermal well is normally a drilled hole in the rock and/or soil material of the ground, along which a liquid heat carrier is transported so as to heat exchange with the ground material surrounding the thermal well. For instance, such thermal wells are used in geothermal heating and cooling systems, such as for geothermal heat pumping-based heating and/or cooling systems for buildings, as well as for free-cooling systems and seasonal thermal load balancing systems.

In order to efficiently exploit the thermal capacity of the ground, it is common for such thermal wells to be relatively deep, such as being drilled at least 100 meters down from the ground level.

A general challenge when designing and installing such geothermal wells is to achieve efficient thermal contact with the heat carrier and the surrounding ground material. The drilled hole will, for instance, typically be more or less filled with subsoil water.

Another problem is that the heat carrier, frequently comprising environmentally harmful constituents, must be prevented from leaking out into the ground. Therefore, the heat carrier must be circulated in a leak-free, closed loop.

The aggressive environment in a thermal well, as well as environmental concerns, pose certain requirements on materials that are to be used in subsoil thermal well installations. For instance, the use of metal alloys sensitive to corrosion and PVC plastics is problematic.

Various types of tubing and piping have been suggested for transferring the heat carrier down into the well and then up again, in a closed loop. For instance, a simple U-pipe is a conventional solution.

As an alternative, a coaxial pipe or tube has been proposed, wherein the heat carrier is transported in one vertical direction in an inner pipe or tube and in an opposite direction in an outer pipe or tube. Then, the inner and outer pipes or tubes are connected at the bottom of the well. Such coaxial tubes have proven to be thermally efficient, since the inner tube is insulated by the outer tube. However, coaxial tubing is very bulky and difficult to transport. In particular, rolls of such coaxial tubing take up much space. Therefore, their use is relatively expensive.

The present invention solves the above described problems, and in particular provides an improved coaxial tubing arrangement and a way to install the same.

Hence, the invention relates to a method for installing and operating a thermal well heat carrier transport system, which method is characterised in that the method comprises the installation steps a) providing a first flexible tubular part into and along a drilled thermal well having a length direction, a cross-section perpendicularly to the length direction and a radial direction; b) providing a second flexible tubular part into and along the first flexible tubular part along the thermal well; c) providing into the second flexible tubular part an installation liquid at an installation overpressure sufficient to press the first flexible tubular part radially against the inner walls of the thermal well in all radial directions in said cross-section; d) providing into and along the second flexible tubular part a third tubular part, having an open end at a distal length end of the third tubular part; and in that the method further comprises the operation step e) providing into the second flexible tubular part, directly or via the third flexible tubular part, liquid heat carrier at an operation overpressure sufficient to press the first flexible tubular part radially against the inner walls of the thermal well in all radial directions in said cross-section.

Furthermore, the invention relates to a thermal well heat carrier transport system, which system is characterised in that the system comprises a first flexible tubular part, arranged in and along a drilled thermal well having a length direction, a cross-section perpendicularly to the length direction and a radial direction; a second flexible tubular part, arranged in and along the first flexible tubular part along the thermal well; and a third tubular part, arranged in and along the second flexible tubular part and having an open end at a distal length end of the third tubular part; and a circulation device, arranged to circulate liquid heat carrier in the second and third flexible tubular parts at an operation overpressure, and in that the operation overpressure is sufficient to press the first flexible tubular part w radially against the inner walls of the thermal well in all radial directions in said cross-section.

In the following, the invention will be described in detail, with reference to exemplifying embodiments of the invention and to the enclosed drawings, wherein:

FIGS. 2-5 share the same reference numerals for same or corresponding parts.

Figure 1:
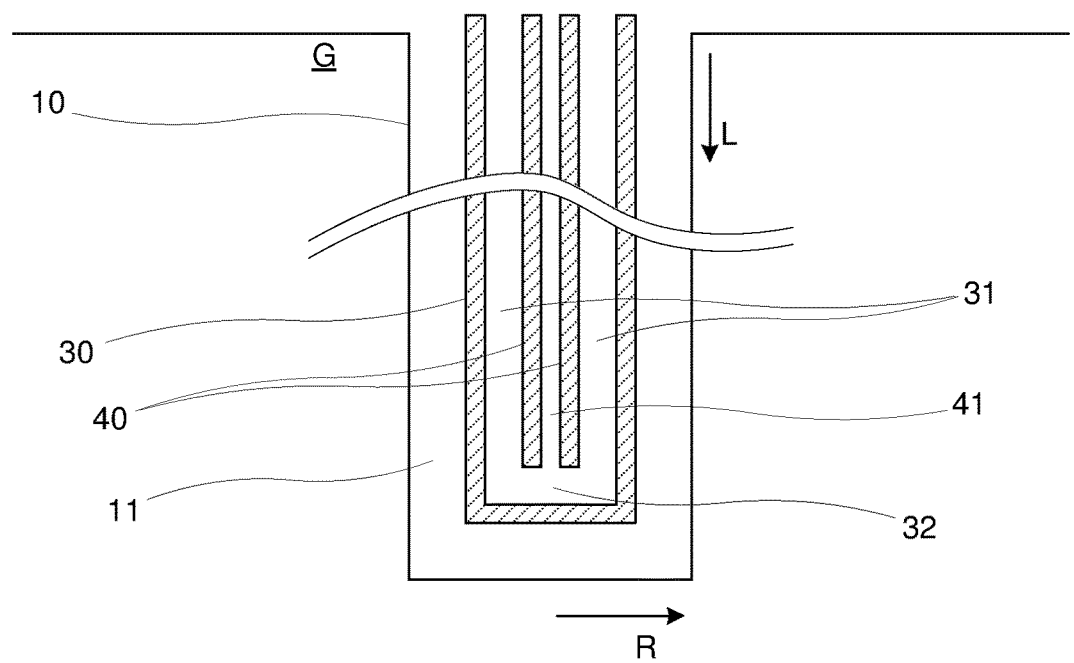
FIG. 1 is schematic cross-sectional view of a conventional thermal well heat carrier transport system.

Hence, FIG. 1 illustrates a conventional thermal well heat carrier transport system, employing a coaxial tube assembly for conveying the heat carrier down into, and again up from, a thermal well 10.

The prior art thermal well 10 shown in FIG. 1, like the thermal well 110 illustrated in FIG. 2-6, is associated with a length direction L, which may be completely or substantially vertical, or, in other cases, be set at a slanting angle downwards into the ground G. The ground G may be rock, soil or a combination of the two. The present invention is best applied in drilled holes in a bedrock ground G, in which the inner walls of the thermal well 10, 110 are self-supporting. However, the invention is also applicable in thermal wells 10, 110 having installed wall reinforcement arrangements, such as a concrete or metal sleeve, as a part of the thermal well 10, 100 in question.

Furthermore, the thermal well 10, 110 is associated with a cross-section, perpendicular to the said length direction L, and also with a radial direction R lying in said cross-section. Hence, the cross-section may be horizontal or substantially horizontal. In general, the thermal well 10, 110 may be cylindrical, and in particular circular cylindrical. In other words, its shape in the said cross-section may be circular or substantially circular. It is preferably at least 50 meters deep, more preferably at least 200 meters deep, and is preferably between 10 cm and 50 cm of diameter.

In the prior art thermal well 10, there is provided a coaxial tubing arrangement, which has been lowered down into the thermal well 10 to a position in which the coaxial tubing arrangement runs in and along the thermal well 10 in substantially the whole length L of the thermal well 10. The coaxial tubing arrangement comprises an outer coaxial tube 30 and an inner coaxial tube 40. The space between said tubes 30, 40 defines an outer channel 31, and the inner coaxial tube 40 defines an inner channel 41. The outer channel 31 comprises a lowermost zone 32, providing a passage between the channels 31, 41.

In operation, the liquid heat carrier is brought down into the thermal well 10, from its top opening, in the inner channel 41, then passes via zone 32 to the outer channel 31 through which it again flows upwards to the thermal well 10 opening. The flow may also be reversed, so that the heat carrier flows down in channel 31 and up in channel 41.

The outer coaxial tube 30 hangs freely in the thermal well 10, so that a space 11 is defined between the wall of the thermal well 10 and the outer coaxial tube 30. This space 11 is typically filled completely or partly with subsoil water, which is not to be contaminated by the heat carrier being transported in the coaxial tubes 30, 40.

In order to guarantee that no such contamination occurs, the coaxial tube arrangement is normally pressure-tested before being installed in the thermal well 10. Such pressure-testing is normally conducted with a certain safety margin. The result is that the outer coaxial tube 30 must be made fairly robust. As a result, rolling up the coaxial tube arrangement will yield a very bulky roll of material, being difficult and expensive to transport. It is in general difficult to assembly the coaxial tube arrangement on-site from shorter pieces, since this invalidates the said pressure-test of the outer coaxial tube.

Furthermore, the space 11, with its subsoil water, provides for a less-than-optimal thermal transfer efficiency between the thermal well 10 wall and the coaxial tube arrangement, resulting in poorer overall system efficiency than desired.

Figure 6:
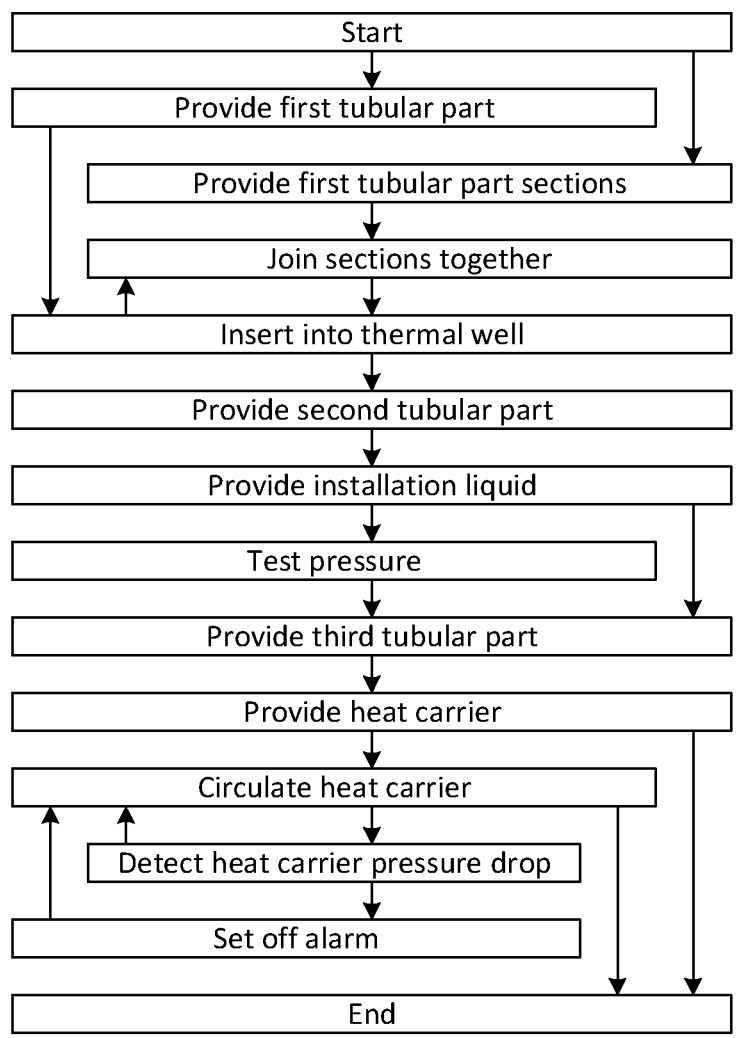
FIG. 6 is a flowchart illustrating a method according to the present invention.

FIG. 6 is a flowchart illustrating a method according to the present invention, for installing and operating a thermal well 110 heat carrier transport system 100 according to the invention. In a first step, the method starts.

Figure 2:
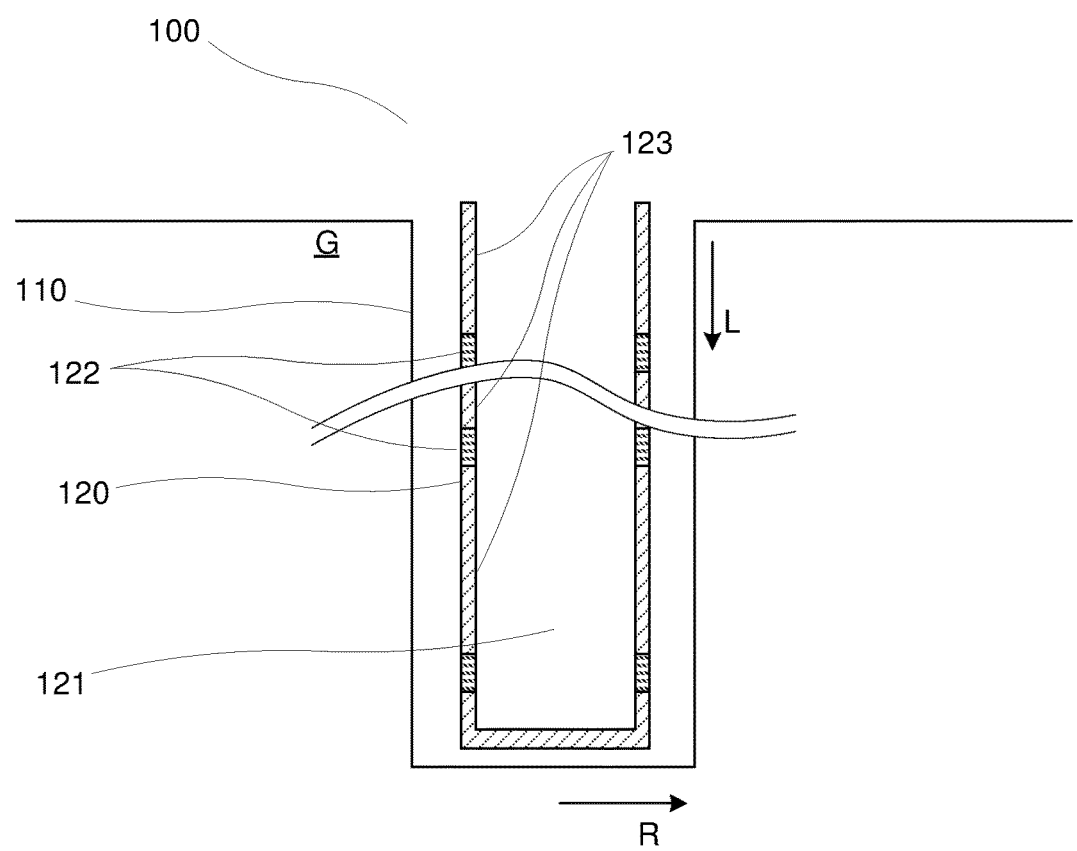
FIG. 2 is schematic cross-sectional view of a thermal well heat carrier transport system according to the invention, in a first installation state.

In a subsequent first part provision step according to the present invention, a first flexible tubular part 120 is provided into and along the drilled thermal well 110. Preferably, the first flexible tubular part 120 is provided along the entire or substantially the entire length L of the thermal well 110, such as all the way to a bottom of the well 110 save for a margin of at the most 5 meters, preferably at the most 2 meters, at the said bottom. The result after this step is illustrated in FIG. 2.

One of the advantages of the present method is that the first flexible tubular part 120 may be provided as a set of at least two separate first part tubular sections 123, arranged to be fastened one to the other at their respective ends so as to together form the first flexible tubular part 120. In FIG. 2, a number of such tubular sections 123 are illustrated, arranged one after the other in their respective longitudinal L direction, and joined to each other at respective common joints 122 so as to together form the first flexible tubular part 120.

That the tubular sections 123 are "separate" means that they are not formed by the same, connected material body, but that they are formed from separate respective material bodies that are then joined together, such as at the site for the thermal well 110, so as to together form the first tubular part 120. Once the sections 123 have been joined together, the first tubular part 120 of course forms a connected body, which may be substantially or completely liquid-tight with respect to any liquid to be circulated within the first tubular part 120.

The set of said separate sections 123 may comprise one or more sections that are at the most 10 meters of length. Preferably, all or substantially all of said set of separate sections 123 are at the most 10 meters of length. The present inventors have found that separate sections of about 5 meters of length provide for easy transportability of the material required for installing a system 100 according to the invention, while at the same time providing an efficient installation procedure.

Said sections 123 may also be of standard size, so that a particular first tubular part 120 may be concatenated from a certain number of such sections 123 sufficient to fill substantially the entire length L of the thermal well 110.

Namely, one of the advantages of the present invention is also to be able to install a system 100 according to the invention in thermal wells 110 of different depths/lengths, by simply using a larger number of separate sections 123 for deeper wells 110. In contrast thereto, in the the conventional system illustrated in FIG. 1 wells of different depths require coaxial tube arrangements of different predefined, fixed lengths.

The separate sections 123 in question may be fastened together using cooperating threads formed as respective integrated parts of the material of the separate section 123 in question.

In particular, the first flexible tubular part 120 as a whole, and in particular each of said separate sections 123, may be made from PE (Poly Ehtylene) plastic. Such PE plastic is durable and flexible, both of which properties are advantageous in the context of the context of the present invention. In particular, as we will see in the following, the first tubular part 120 needs not be guaranteed to be leak-proof, why it is possible to provide the separate sections 123 with cooperating threads formed directly in the PE plastic material of the section 123 itself. For instance, each separate section 123 may be provided with a male thread at one end and a corresponding female thread at an opposite end.

The first tubular part 120, in particular when made from PE plastic, may have a wall thickness of at the most 8 mm, preferably between 2 mm and 8 mm, most preferably between 2 mm and 5 mm.

For increased durability, the thread joints 122 may be glued, with a suitable PE glue, and/or sealed using an O-ring, before lowering the sections 123 in question down into the well 110.

The joints 122 may be mounted/installed above ground, after which the sections 123 in question may be lowered down into the well 100 forming the first tubular part 120. In particular, the joints 122 may be accomplished as a part of the installation procedure in physical proximity to the thermal well 110, at the installation site, as opposed to during a prior manufacturing step at a distant location in relation to the thermal well 110.

Hence, the first flexible tubular part 120 is inserted, section 123 by section 123 or in its entirety, into the thermal well 110.

The first flexible tubular part 120, and as applicable each of said sections 123 thereof, is preferably slightly smaller in the radial direction R than the inner walls of the thermal well 110. In other words, in a relaxed tube-shaped state, the first tubular part 120, or each of the sections as the case may be, has an average diameter which is less than a corresponding inner diameter of the thermal well 110. In particular, the average diameter in question preferably at the most 10 mm smaller than said corresponding inner diameter of the thermal well 110. This will allow the first flexible tubular part 120 to be insertable into the thermal well 110 while at the same time being readily expandable to make contact with the thermal well 110 walls as described below. In order to be able to insert the first w tubular part 120 all the way down into the thermal well, up to a bottom thereof, a weight (not shown) may be used, attached to the first tubular part 120. A bottom part of the first tubular part 120 may comprise a hook means, to which a weight can be attached for lowering down the first tubular part 120 into the thermal well 110.

During the lowering down of the first tubular part 120, the inside 121 of the first tubular part 120 may be successively filled with installation liquid, to keep the tubular shape of the first tubular part 120 inside the thermal well 110. In particular, the thermal well 110 may already be partly or completely filled with subsoil water.

As is clear from FIG. 2, the first tubular part 120 having been installed in the thermal well 110 is substantially or completely liquid-tight towards a bottom of the thermal well 110, for instance using an attached bottom part of the tubular part 120. This bottom part may be fastened to the first tubular part 120, or to the downwards-most section 123, in the corresponding way as the sections 123 being fastened to each other. In particular, the bottom part may be made from the same material as the sections 123.

In a subsequent second part provision step according to the present invention, a second flexible tubular part 130 is provided coaxially into and along the interior 121 of the first flexible tubular part 120, along the thermal well 110. Preferably, the second flexible tubular part 130 is provided along the entire length L of the first flexible tubular part 120 so that it makes physical contact with said first tubular part 120 bottom. The result after this step is illustrated in FIG. 3.

The second flexible tubular part 130 may be provided as an elongated, connected tube without any joints, extending after the second part provision step along substantially the whole length L of the thermal well 110. Since the second tubular part 130 is not a coaxial tube, and since its material may be of limited thickness as will be described below, it may be easily rolled up for transport, and may even be cut to correct length L at the installation site.

In particular, the second flexible tubular part 130 may be made from PE plastic.

Figure 3:
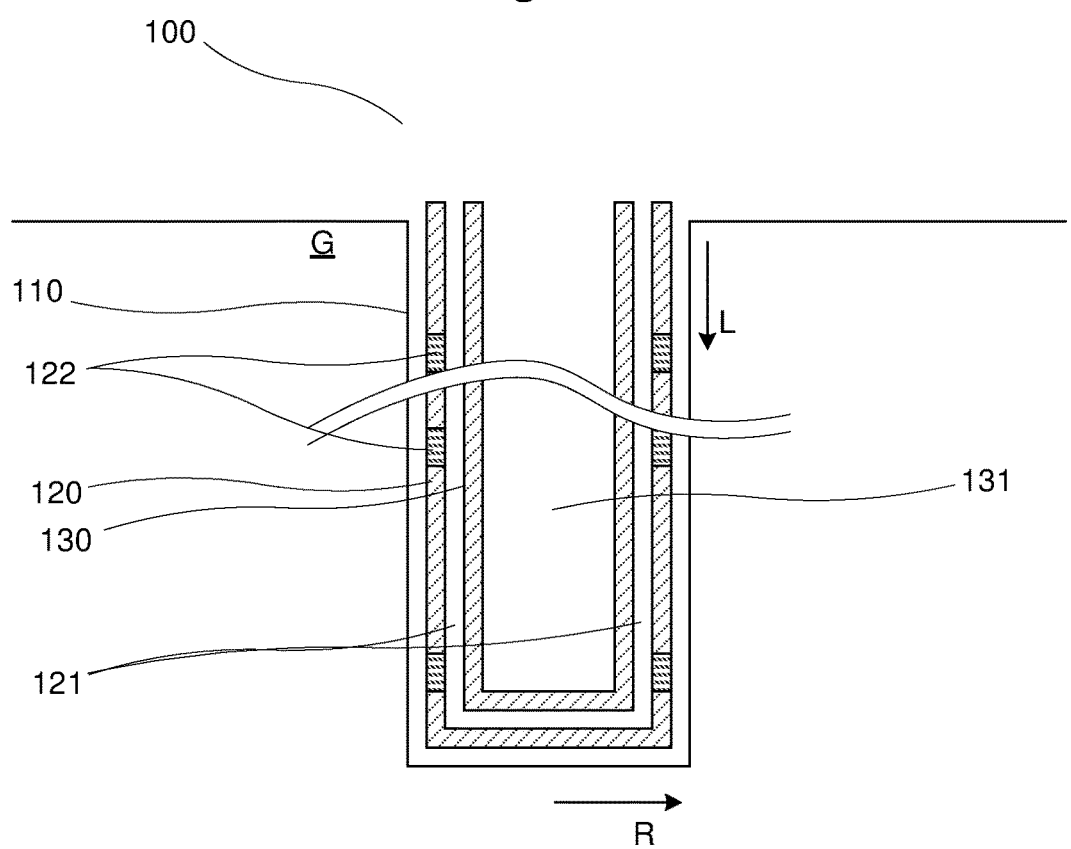
FIG. 3 is schematic cross-sectional view of the thermal well heat carrier transport system of FIG. 2, in a second installation state.

As is illustrated in FIG. 3, the second tubular part 130 has a closed bottom at a distal (bottom) end thereof, which closed bottom is arranged to make direct physical contact with the first tubular part 120.

Furthermore, the second flexible tubular part 130 may be arranged to deform radially R more easily than what is the case for the first tubular part 120 as a result of a particular internal overpressure (such as the below-described test and operation overpressures), and it may also have a wall thickness which is thinner than a corresponding wall thickness of the first flexible tubular part 120.

Herein, the term "overpressure" in a particular space refers to an overpressure in relation to an environment pressure. In particular, at the well 110 orifice, the overpressure is measured as an overpressure in relation to the atmospheric pressure at that height. Going down into the well, the environment pressure of course increases, in particular in the case when there is subsoil water and/or thermal medium present in the well 110, pressure due to an increased hydrostatic pressure. In the case of a substantially liquid-filled well 110, such as during installation and operation, the overpressure is preferably measured at the well 110 orifice.

The second tubular part 130 may have a wall thickness, in particular when made from PE plastic, of at the most 3 mm, preferably between 1 mm and 3 mm.

In a subsequent installation liquid provision step, an installation liquid is provided into an interior 131 of the second flexible tubular part 130, which is hence then arranged coaxially inside and along the first tubular part 120. The installation liquid, which may be water or any other suitable liquid, is provided at an installation overpressure sufficient to press the first flexible tubular part 120 radially against the inner walls of the thermal well 110 in all radial directions R in said cross-section. Hence, the installation liquid presses against the second tubular part 130, causing it to expand elastically and in turn pressing against the first tubular part 120, causing it also to expand elastically to a corresponding extent so as to make direct physical contact with the thermal well 110 inner walls all around and all along the used part of the thermal well 110. The above described bottom part may also be pressed against a bottom of the thermal well 110, or against the above-described weight, or similar, as may be the case.

The installation overpressure is provided to be so high so as to achieve that the first tubular part 120 is pressed into abutment with the thermal wall 110 even in case this has to be done against the counterpressure of subsoil water already present between the inner walls of the thermal well 110 and the first tubular part 120. Preferably, the installation overpressure is an overpressure of at least 0.5 bars, more preferably of at least 1 bars.

The result of this installation liquid provision step is illustrated in FIG. 3. It is noted that the Figures are not drawn to scale and are schematic. Hence, at the installation overpressure, the space indicated by 121 in FIG. 3 is in fact completely eradicated, the second tubular part 130 pressing directly against the first tubular part 120.

In a subsequent installation liquid pressure testing step, a pressure test may be performed in relation to the aggregate of the first 120 and second 130 tubular parts, and in particular with the aim of securing that this tubular part 120, 130 aggregate together forms a liquid-tight container in the thermal well 110. In this pressure test, the pressure of the installation liquid or heat carrier (see below) in the second flexible tubular part 130 may be controlled to a predetermined test overpressure. Then, at this test overpressure, it is investigated if any installation liquid or heat carrier is leaked out from the second flexible tubular part 130. This can, for instance, be achieved by achieving the test overpressure via a valve from the top of the thermal well 110, and detecting, using a suitable pressure detector in, or in liquid contact with, the installation liquid or heat carrier in the second tubular part 130, if the pressure of the liquid in the second tubular part 130 decreases over time or stays the same. If no liquid leakages are detected, the first 120 and second 130 tubular parts, as an aggregate, may be allowed as a heat carrier liquid barrier for the thermal well 110.

It is hence the second tubular part 130 that provides adequate and guaranteed water-tightness of the tubular aggregate, as opposed to the first tubular part 120 (even though the first tubular part 120 may very well also be water-tight). Since the first tubular part 120 is pressed directly against the interior thermal well 110 walls, it can absorb irregularities in said wall. Therefore, the second tubular part 130, being supported by the surface in the well 110 provided by the inner surface of the first tubular part 120, may provide liquid-tightness despite it being made from relatively thin flexible material.

Figure 4:
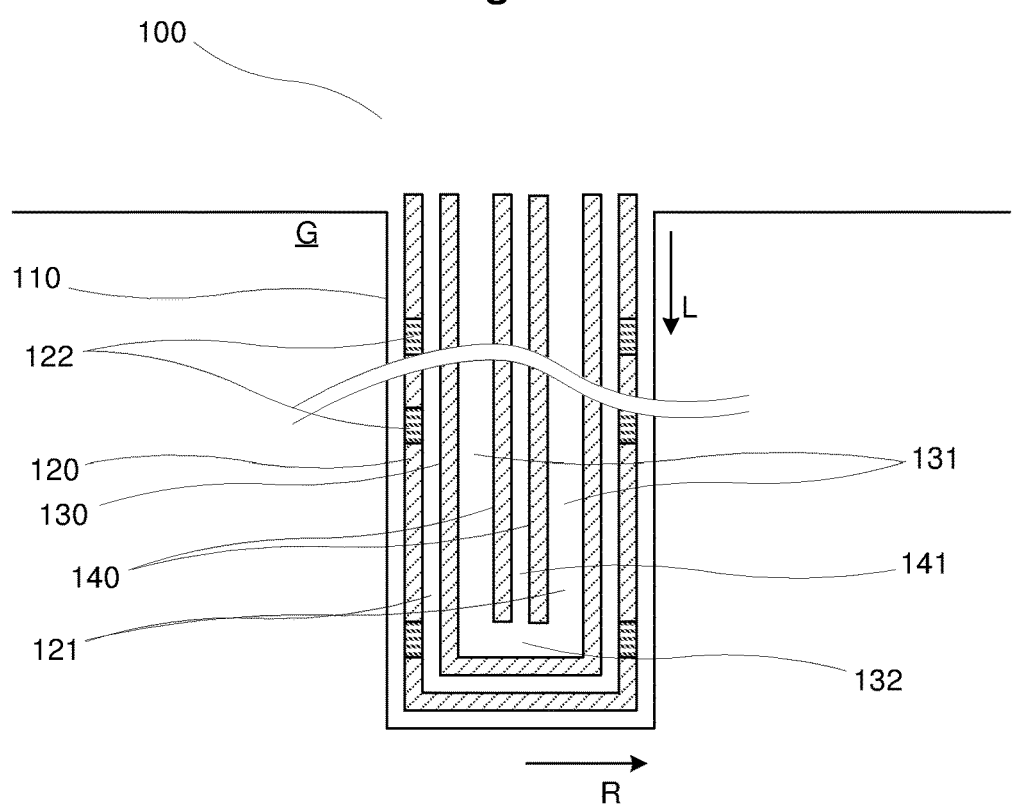
FIG. 4 is also schematic cross-sectional view of the thermal well heat carrier transport system of FIG. 2, but in a third installation state.

In a subsequent third part provision step, a third tubular part 140 is provided coaxially into and along the interior 131 of the second flexible tubular part 130, from the top of the thermal well 110. As illustrated in FIG. 4, showing the state after this insertion, the third tubular part 140 has an open end at a distal length L end of the third tubular part 140 near the bottom of the second tubular part 130. The opening of the third tubular part 140 opens out into a lower passage 132 between an interior 141 of the third tubular part 140 and the rest of the interior 131 of the second tubular part 130.

The third tubular part 140 may be a flexible or rigid tube, preferably flexible for easy rollup and transport. It may be manufactured from PE plastic or any other suitable polymer material, and may also be insulated, such as having an insulating material wall layer of 2 mm to 10 mm. In some cases, a porous plastic material may be used, and if needed a weight to keep the third tubular part 140 at a desired location in the well without floating upwards. It may also comprise centering means, such as projections from its envelope surface, arranged to center the third tubular part 140 concentrically in the second tubular part 130. It is preferred that the inner diameter of the third tubular part 140 is selected, in relation to the diameter of the first tubular part 120, such that the flow velocity along the channel 141 is at least as high, preferably larger than, the flow velocity in channel 131. This achieves a good thermal efficiency.

Since the installation liquid is present in the interior 131 of the second tubular part 130 at said installation overpressure, the first 120 and second 130 tubular parts are pressed against the thermal well 110 walls, leaving unhindered passage down into and through the interior 131 for the third tubular part 140.

It is noted that all three tubular parts 120, 130, 140 after insertion are concentrically arranged. However, after the insertion of the third tubular part 140, the tubular parts 120, 130, 140 together also form a coaxial arrangement in which the third tubular part 140 forms a central coaxial tube element, having a central channel 141, and the first 120 and second 130 tubular parts together form a peripheral coaxial tube element, having a peripheral channel 131. Liquid can pass between the central channel 141 and the peripheral channel 131 via the passage 132 provided by the third tubular part 140 not being inserted all the way down onto the bottom of the second tubular part 130.

The third tubular part 140 may have an outer diameter which is less than 70%, preferably at the most 50%, of an inner diameter of the second flexible tubular part 130 when the installation liquid is present in the second flexible tubular part 130 at said installation overpressure, and the second tubular part 130 hence being fully elastically expanded by said overpressure.

In a subsequent heat carrier provision step, a liquid heat carrier is provided into the second flexible tubular part 130, directly or via the third flexible tubular part 140, at an operation overpressure which, similarly to the said installation overpressure, is sufficient to press the first flexible tubular part 120 radially R against the inner walls of the thermal well 110 in all radial directions R in said cross-section.

The liquid heat carrier may be any suitable heat carrier which is to be used for performing heat exchange between the ground G surrounding the thermal well 110 and a piece of equipment, such as a heat pump, a heat exchanger and so forth. For instance, the heat carrier may be water with anti-freeze additive.

In particular, the installation liquid may be the same as the liquid heat carrier. However, it is advantageous that, in case the heat carrier is environmentally harmful, the installation liquid is only water without additives. This solves the problems of heat carrier leakage during the above described pressure test.

In case the heat carrier is the same as the installation liquid, circulation of the heat carrier may simply begin by supplying more heat carrier to either the central 141 or peripheral 131 channel and allowing a counter-flow to occur through the other channel.

In case the heat carrier is not the same as the installation liquid, in the heat carrier provision step the heat carrier may be provided through either the central 141 or the peripheral 131 channel, and while being inserted pressing out the installation liquid gradually through the other channel for collection. Then, circulation of the heat carrier can proceed.

The operation overpressure may be an overpressure of between 0.5 and 3 bars, preferably of between 1 and 2 bars.

In a subsequent operation pressure detection step, performed during heat exchanging operation of the thermal well 110, while the heat carrier is kept at said operation overpressure and may be circulated through the thermal well 110, a decrease may be detected of the heat carrier pressure in the second flexible tubular part 130 and interpreted as a leakage of heat carrier out from the second flexible tubular part 130. It is noted that, since the second tubular part 130 is in liquid communication with the third tubular part 140, a detection of the operation pressure in the third tubular part 130 may alternatively be conducted to the same result.

Naturally, depending on where the operation pressure is measured, a leak may be present and result in a decreased pressure anywhere along a heat carrier conduit leading to and past the thermal well 110, as well as being due to a leak through the first 120 and second 130 tubular parts. However, an operator receiving an alarm or similar set off by the detection of a decreased heat carrier pressure will, however, know that a leak in the thermal well 110 is one possibility, and may use that as a starting point information when finding and mending the leak.

Figure 5:
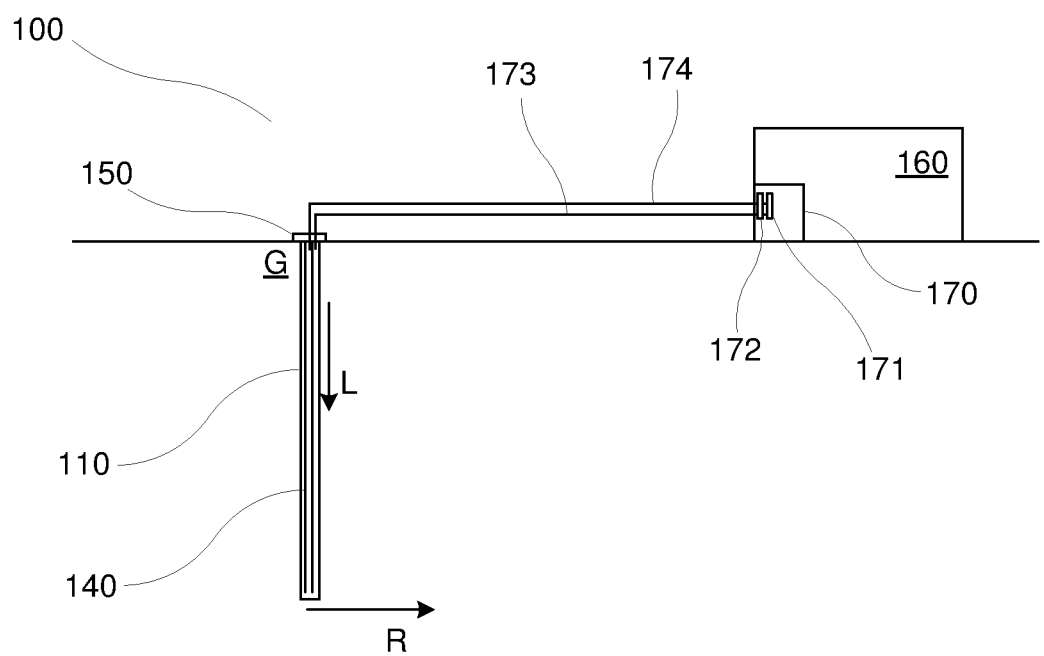
FIG. 5 is a schematic view of a system according to the present invention.

FIG. 5 illustrates a system 100 according to the invention, arranged for heat exchange in relation to the thermal well 110. The system 100 comprises the above described tubular part aggregate, installed as described above and comprising the first flexible tubular part 120, arranged in and along the thermal well 110; the second flexible tubular part 130, arranged in and along the first flexible tubular part 120 along the thermal well 110; and the third tubular part 140, arranged in and along the second flexible tubular part 130 and having its open end at the distal length end of the third tubular part 130.

Furthermore, the system 100 comprises a circulation device 170, such as in the form of a heat pump or heat exchange device installed in a structure such as a building 160. The circulation device 170 is arranged to circulate the liquid heat carrier in the second 130 and third 140 flexible tubular parts at the above discussed operation overpressure. In particular, this circulation takes place in the coaxial channels 131, 141 as described above.

The thermal well 110 is covered by a lid 150 or other suitable structural element, providing a liquid-tight sealing of the thermal well 110, and in particular of the channels 131, 141, so as to allow the said operation overpressure to prevail without the heat carrier leaking out from the thermal well 110.

Conduit lines 173, 174 carry the heat carrier back and forth between the thermal well 110 and the circulation device 170 so as to achieve said circulation of the heat carrier. The lines 173, 174, together with the circulation means 170 and coaxial channels 131, 141, may form a closed loop heat carrier conduit.

The system 100 further comprises a pressure measurement device 172, which may be arranged as a part of the circulation device 170, such as inside the structure 160, and which may be used for performing said pressure test during installation as well as for detecting said pressure decrease of the heat carrier during operation.

It is understood that the said operation overpressure will prevail throughout heat exchanging operation, and also during times when the circulation means 170 is possibly not arranged to circulate the heat carrier. As soon as the operation overpressure is removed, the first tubular part 120 will collapse from its position pressed against the inner walls of the thermal well 110.

The system 100 may further comprise means, such as in turn comprising the pressure measurement device 172, arranged to continuously or intermittently measure the current operation pressure and to detect a decrease or drop thereof, and in case such a decrease or drop is detected set off some type of alarm for the information of a user of the system 100.

The system 100 also comprises a control unit 171, which may also be arranged as a part of the circulation device 170, such as inside the structure 160. The control unit 171 may then be arranged to control the operation of the circulation device 170, and in particular to perform said pressure decrease or drop detection.

Such a system 100 provides for very high thermal efficiency, since the tubular aggregate will provide, via its large abutment surface to the thermal well 110 inside surface, excellent thermal energy transfer properties between the ground G and the heat carrier.

The component parts of the system 100 are also easy to transport, in a modular fashion, for safe and simple installation and pressure testing on-site.

All this is achieved using inexpensive, standard material, and with the option to use the existing functionality of a circulation device 170 for performing on-site pressure tests.

Above, preferred embodiments have been described. However, it is apparent to the skilled person that many modifications can be made to the disclosed embodiments without departing from the basic idea of the invention.

For instance, the system 100 may make use of more than one thermal well 110. Then, a respective tubular arrangement of the above-described type is installed in each of such several thermal wells 110, and lines 173, 174 can be used to circulate heat carrier through said wells in a parallel and/or serial manner, in a closed loop throughout which the said operation overpressure is maintained. Each such thermal well 110 may be installed as described above, for instance by connecting the thermal well 110 in question individually to the circulation device 170 for performing the pressure test before starting heating/cooling operation.

The system 100 according to the present invention may be used for heating and/or for cooling purposes of the structure 160. It may also be used for heating and/or cooling other types of structures 160 than buildings, such as the ground (for instance heated soccer fields); swimming pools; hot tap water; or a as a component part of a district heating/cooling system.

All which has been said herein in relation to the method is also applicable to the system 100, and vice versa.

Hence, the invention is not limited to the described embodiments, but can be varied within the scope of the enclosed claims.

The invention claimed is:

1. A method for installing and operating a thermal well heat carrier transport system, the method comprises the installation steps:
    a) providing a first flexible tubular part into and along a drilled thermal well having a length direction, a cross-section perpendicular to the length direction and a radial direction;
    b) providing a second flexible tubular part into and along the first flexible tubular part along the thermal well;
    c) providing into the second flexible tubular part an installation liquid at an installation overpressure sufficient to press the second flexible tubular part against inner walls of the first flexible tubular part and, in turn, press the first flexible tubular part radially against the inner walls of the thermal well in all radial directions in said cross-section;
    d) providing into and along the second flexible tubular part a third tubular part, having an open end at a distal length end of the third tubular part, the open end of the third tubular part configured to allow liquid to flow into the second flexible tubular part from the third tubular part;
    and wherein the method further comprises the operation step:
    e) providing into the second flexible tubular part, via the third flexible tubular part, liquid heat carrier at an operation overpressure sufficient to also press the second flexible tubular part against inner walls of the first flexible tubular part and, in turn, press the first flexible tubular part radially against the inner walls of the thermal well in all radial directions in said cross-section.

2. The method according to claim 1, wherein the first flexible tubular part is provided as several separate tubular sections arranged to be fastened one to the other at their respective ends so as to form the first flexible tubular part.

3. The method according to claim 2, wherein the said separate sections comprise one or more sections that are at the most 10 meters of length.

4. The method according to claim 2, wherein the said separate sections are fastened together using cooperating threads formed as respective integrated parts of the material of the section in question.

5. The method according to claim 1, wherein the first flexible tubular part is made from Poly Ethylene (PE) plastic.

6. The method according to claim 1, wherein the first flexible tubular part, in a relaxed tube-shaped state, has an average diameter which is less than a corresponding inner diameter of the thermal well.

7. The method according to claim 6, wherein the first flexible tubular part, in said relaxed tube-shaped state, has an average diameter which is at the most 10 mm smaller than said corresponding inner diameter of the thermal well.

8. The method according to claim 1, wherein the second flexible tubular part is provided as an elongated, connected tube without any joints, extending after step b) along substantially the whole length of the thermal well.

9. The method according to claim 1, wherein the second flexible tubular part is made from Poly Ethylene (PE) plastic.

10. The method according to claim 1, wherein the second flexible tubular part deforms radially more easily than the first tubular part.

11. The method according to claim 1, wherein the installation liquid is the same liquid as the liquid heat carrier.

12. The method according to claim 1, wherein the third tubular part has an outer diameter which is less than 70% of an inner diameter of the second flexible tubular part when the installation liquid is present in the second flexible tubular part at said installation overpressure.

13. The method according to claim 1, wherein the operation overpressure is an overpressure of between 0.5 and 3 bars.

14. The method according to claim 1, wherein the method further comprises the additional installation step, performed subsequent to step c), of performing a pressure test in which the pressure of the installation liquid or heat carrier in the second flexible tubular part is controlled to be a test overpressure, and it is investigated if, at said test overpressure, any installation liquid or heat carrier is leaked out from the second flexible tubular part.

15. The method according to claim 1, wherein the method further comprises the additional operation step of, while the heat carrier is kept at said operation overpressure, detecting a decrease of the heat carrier in the second flexible tubular part and interpreting this decrease as a leakage of heat carrier out from the second flexible tubular part.

16. The method according to claim 1, wherein the second flexible tubular part has a wall thickness that is thinner than a corresponding wall thickness of the first flexible tubular part.

17. The method according to claim 1, wherein the operation overpressure is an overpressure of between 1 and 2 bars.

18. The method according to claim 1, wherein the installation liquid is the same liquid as the liquid heat carrier.

19. A thermal well heat carrier transport system, the system comprises:
 a first flexible tubular part, arranged in and along a drilled thermal well having a length direction, a cross-section perpendicular to the length direction and a radial direction, the first flexible tubular part closed at a distal length end thereof;
 a second flexible tubular part, arranged in and along the first flexible tubular part along the thermal well, the second flexible tubular part closed at a distal length end thereof; and
 a third flexible tubular part, arranged in and along the second flexible tubular part and having an open end at a distal length end of the third tubular part; and
 a circulation device, arranged to circulate liquid heat carrier in the second and third flexible tubular parts at an operation overpressure,
 and wherein the operation overpressure is sufficient to press the second flexible tubular part against inner walls of the first flexible tubular part and, in turn, press the first flexible tubular part radially against inner walls of the drilled thermal well in all radial directions in said cross-section.

20. The thermal well heat carrier transport system according to claim 19, wherein the first flexible tubular part comprises a plurality of separate tubular sections that are fastened together at their respective ends.

21. A method for installing and operating a thermal well heat carrier transport system, the method comprises the installation steps:
 a) providing a first flexible tubular part into and along a drilled thermal well having a length direction, a cross-section perpendicular to the length direction and a radial direction;
 b) providing a second flexible tubular part into and along the first flexible tubular part along the thermal well;
 c) providing into the second flexible tubular part an installation liquid at an installation overpressure sufficient to press the second flexible tubular part against inner walls of the first flexible tubular part and, in turn, press the first flexible tubular part radially against the inner walls of the thermal well in all radial directions in said cross-section;
 d) providing into and along the second flexible tubular part a third tubular part, having an open end at a distal length end of the third tubular part, the open end of the third tubular part configured to allow liquid to flow into the third flexible tubular part from the second tubular part;
and wherein the method further comprises the operation step:
 e) providing, directly into the second flexible tubular part, liquid heat carrier at an operation overpressure sufficient to also press the second flexible tubular part against inner walls of the first flexible tubular part and, in turn, press the first flexible tubular part radially against the inner walls of the thermal well in all radial directions in said cross-section.

* * * * *